(12) United States Patent
Buchheim et al.

(10) Patent No.: US 9,567,786 B2
(45) Date of Patent: Feb. 14, 2017

(54) BRAKING DEVICE FOR BRAKING A MOVEMENT OF A FIRST VEHICLE PART AND A SECOND VEHICLE PART WITH RESPECT TO EACH OTHER

(71) Applicant: Brose Fahrzeugteile GmbH & Co. Kommanditgesellschaft, Hallstadt, Hallstadt (DE)

(72) Inventors: Michael Buchheim, Wurzen (DE); Linda Loeffler, Lake Orion, MI (US)

(73) Assignee: Brose Fahrzeugteile GMBH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/581,735

(22) Filed: Dec. 23, 2014

(65) Prior Publication Data

US 2016/0177612 A1   Jun. 23, 2016

(51) Int. Cl.
*F16F 7/09* (2006.01)
*E05F 5/02* (2006.01)
(Continued)

(52) U.S. Cl.
CPC ........... *E05F 5/025* (2013.01); *B62D 33/0273* (2013.01); *E05F 5/08* (2013.01); *F16F 7/09* (2013.01)

(58) Field of Classification Search
CPC ......... B60J 5/101; B62D 33/0273; E05F 3/16; E05F 5/025; E05F 5/08; E05F 5/10; E05F 5/12; E05Y 2900/532; E05Y 2900/546; E05Y 2201/21; E05Y 2201/236; E05Y 2201/26; E05Y 2201/264; E05Y 2201/638; F16F 7/09
See application file for complete search history.

(56) References Cited

U.S. PATENT DOCUMENTS 2,024,887 A * 12/1935 Schonitzer .............. E05F 5/025
                                                    16/85
2,063,526 A * 12/1936 Snowdon .................. E05F 3/16
                                                    16/49
(Continued)

FOREIGN PATENT DOCUMENTS

CH           467423 A  *  1/1969  ................ F16F 7/09
DE         1 208 949          1/1966
(Continued)

OTHER PUBLICATIONS

Extended European Search Report dated May 18, 2016 issued in corresponding European Patent Application No. 15201566.5-1756, 10 pages.

(Continued)

*Primary Examiner* — Glenn Dayoan
*Assistant Examiner* — Paul Chenevert
(74) *Attorney, Agent, or Firm* — Lewis Roca Rothgerber Christie LLP

(57) ABSTRACT

A braking device for braking a movement of a first vehicle part and a second vehicle part with respect to each other includes a housing element having an inner bore and a piston element having a shaft extending in the inner bore along a longitudinal axis and being mounted on the housing element such that the shaft is displaceable along the longitudinal axis with respect to the housing element along a displacement path. A braking element is arranged within the inner bore of the housing element and constituted to provide a friction force for braking a displacement movement of the piston element and the housing element with respect to each other at least within a portion of the displacement path. A tensioning device is constituted to radially, with respect to the longitudinal axis, act onto the braking element to provide a radial tensioning force. The braking element, for braking the displacement movement of the piston element and the (Continued)

housing element with respect to each other, is in frictional contact with the housing element or the piston element or a component connected to the housing element or the piston element at least within the portion of the displacement path.

19 Claims, 8 Drawing Sheets

(51) Int. Cl.
*B62D 33/027* (2006.01)
*E05F 5/08* (2006.01)

(56) References Cited

U.S. PATENT DOCUMENTS

| | | | | | |
|---|---|---|---|---|---|
| 2,646,860 | A | * | 7/1953 | Pirard | F16F 7/09 188/129 |
| 2,746,744 | A | * | 5/1956 | Blattner | B61F 5/125 105/198.2 |
| 3,555,591 | A | * | 1/1971 | Sogoain | E05F 3/16 16/49 |
| 4,483,044 | A | * | 11/1984 | Johnston | E05F 3/02 16/341 |
| 5,421,124 | A | * | 6/1995 | Zuccaro | B60J 5/108 16/DIG. 6 |
| 5,449,213 | A | * | 9/1995 | Kiley | B60J 5/107 296/146.5 |
| 5,460,251 | A | * | 10/1995 | Jeffries | E05F 1/16 188/282.1 |
| 5,517,719 | A | * | 5/1996 | Christ | E05F 3/02 16/49 |
| 5,802,671 | A | * | 9/1998 | Ikuma | E05F 5/022 16/82 |
| 5,839,719 | A | * | 11/1998 | Hosan | B62D 25/12 188/300 |
| 6,081,965 | A | * | 7/2000 | Kupfer | E05C 17/30 16/82 |
| 7,147,216 | B2 | * | 12/2006 | Gassner | E05F 5/02 248/406.2 |
| 7,547,058 | B2 | * | 6/2009 | King | B60J 5/101 296/146.8 |
| 7,566,092 | B2 | * | 7/2009 | Paton | E05F 15/622 296/106 |
| 7,586,280 | B2 | * | 9/2009 | Warren | E05F 15/611 318/266 |
| 7,938,473 | B2 | * | 5/2011 | Paton | B60J 5/101 296/146.8 |
| 9,021,905 | B2 | * | 5/2015 | Reif | B60J 5/101 74/89.23 |
| 9,394,738 | B2 | * | 7/2016 | Bochen | B60J 5/102 |
| 2003/0019077 | A1 | * | 1/2003 | Liao | E05C 17/52 16/76 |
| 2003/0106761 | A1 | * | 6/2003 | Taylor | F16D 13/08 192/41 R |
| 2008/0066385 | A1 | * | 3/2008 | Roach | B62D 33/0273 49/386 |
| 2014/0026623 | A1 | * | 1/2014 | Kim | D06F 37/20 68/140 |
| 2014/0232225 | A1 | * | 8/2014 | Heinze | F16D 41/105 310/76 |
| 2015/0337586 | A1 | * | 11/2015 | Lohken | E05F 5/022 267/140.13 |
| 2016/0215552 | A1 | * | 7/2016 | Lohken | F16F 9/483 |

FOREIGN PATENT DOCUMENTS

| | | | | | |
|---|---|---|---|---|---|
| DE | 1809970 | A1 | * | 6/1970 | F16F 7/09 |
| DE | 2000154 | A1 | * | 7/1971 | D06F 37/20 |
| DE | 2160573 | | * | 6/1973 | F16F 7/09 |
| DE | 2549102 | | * | 5/1977 | E05C 17/30 |
| DE | 2644854 | A1 | * | 4/1978 | E05F 5/12 |
| DE | 3035891 | | * | 4/1982 | B60D 1/155 |
| DE | 3216152 | | * | 12/1982 | D06F 37/20 |
| DE | EP 0790381 | A2 | * | 8/1997 | E05F 3/16 |
| DE | EP 2383412 | A2 | * | 11/2011 | E05F 15/12 |
| DE | EP 3032020 | A1 | * | 6/2016 | F16D 7/021 |
| EP | 1 236 925 | A2 | | 9/2002 | |
| EP | 2 383 412 | A2 | | 11/2011 | |
| FR | 550258 | A | * | 3/1923 | E05F 3/16 |
| FR | 35599 | E | * | 3/1930 | F16F 7/09 |
| FR | 1043095 | A | * | 11/1953 | F16F 7/09 |
| FR | 1101872 | A | * | 10/1955 | F16F 7/09 |
| FR | 1126863 | A | * | 12/1956 | F16F 7/09 |
| FR | 68455 | E | * | 4/1958 | F16F 7/09 |
| FR | 1375206 | A | * | 10/1964 | F16F 7/09 |
| FR | 1483889 | A | * | 6/1967 | F16F 7/09 |
| FR | EP 0145575 | A2 | * | 6/1985 | E05C 17/52 |
| GB | 264003 | A | * | 1/1927 | B62K 25/06 |

OTHER PUBLICATIONS

Machine translation of EP 2 383 412 A2 submitted Jun. 29, 2016, 13 pages.

\* cited by examiner

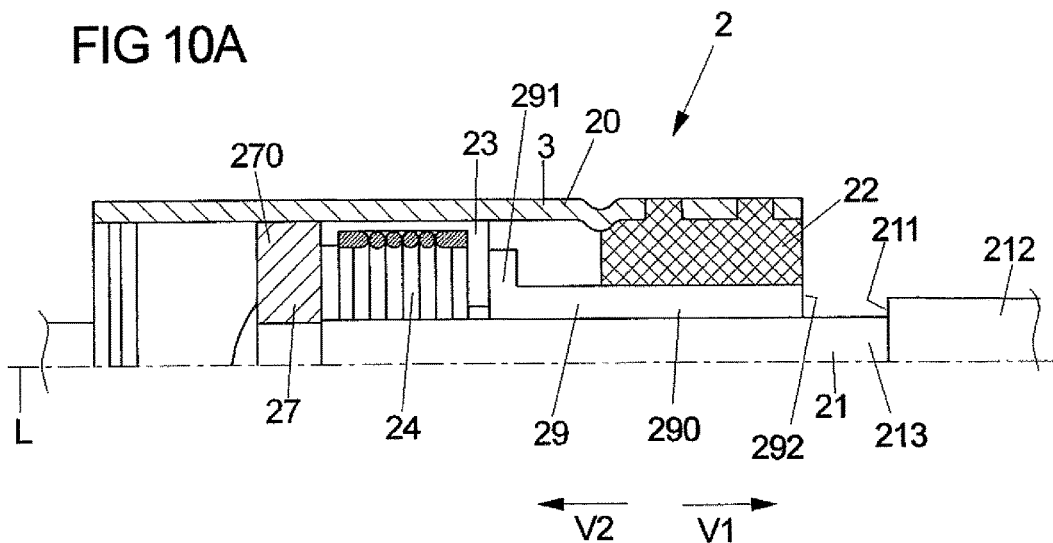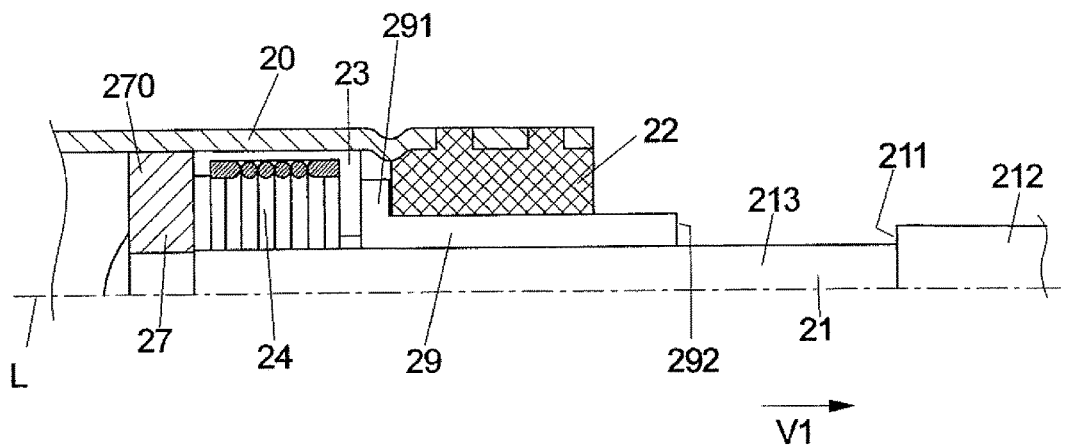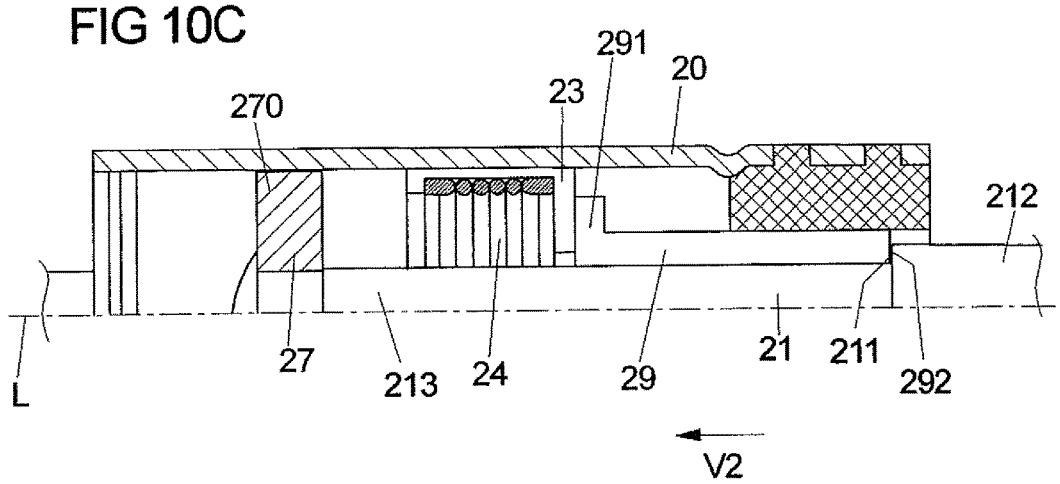

BRAKING DEVICE FOR BRAKING A MOVEMENT OF A FIRST VEHICLE PART AND A SECOND VEHICLE PART WITH RESPECT TO EACH OTHER

FIELD OF THE INVENTION

The invention generally relates to a braking device for braking a movement of a first vehicle part and a second vehicle part with respect to each other.

The invention in particular relates to a tailgate which is pivotably arranged on a vehicle body. A braking device herein is used to brake a pivoting movement of the tailgate with respect to the vehicle body prior to, for example, reaching a fully opened position of the tailgate.

BACKGROUND OF THE INVENTION

A braking device as it is known from DE 1 208 949 A comprises a tube element and a piston element being movable within the tube element. A frictional element is placed within an inner bore of the tube element and is in frictional contact with the tube element. The frictional element is connected with the piston element and is moved together with the piston element when the piston element is displaced with respect to the tube element. Due to the frictional forces acting in-between the frictional element and the inner cylindrical face of the inner bore of the tube element, a braking force is provided over a displacement path along which the piston element is displaceable with respect to the tube element.

SUMMARY OF THE INVENTION

It is an object of the instant invention to provide a braking device which may provide a braking force in particular within an end portion of a displacement path in order to dampen a movement of a vehicle part relative to another vehicle part prior to reaching a stop position.

It is a further object of the instant invention to provide a braking device which may have a reduced wear and tear and which may comprise a reduced number of components.

Accordingly, a braking device for braking a movement of a first vehicle part and a second vehicle part with respect to each other comprises a housing element having an inner bore; a piston element having a shaft extending in the inner bore along a longitudinal axis and being mounted on the housing element such that the shaft is displaceable along the longitudinal axis with respect to the housing element along a displacement path; a braking element arranged within the inner bore of the housing element and constituted to provide a friction force for braking a displacement movement of the piston element and the housing element with respect to each other at least within a portion of the displacement path; and a tensioning device constituted to radially, with respect to the longitudinal axis, act onto the braking element to provide a radial tensioning force; wherein the braking element for braking the displacement movement of the piston element and the housing element with respect to each other, is in frictional contact with the housing element or the piston element or a component connected to the housing element or the piston element at least within said portion of the displacement path.

In one embodiment, said braking element, at least within said portion of the displacement path, can be moved together with one of the piston element and the housing element relative to the other of the piston element and the housing element. For this, the braking element may, for example, be axially fixed with respect to the piston element or the housing element.

If for example the braking element is arranged on the housing element and is axially fixed on the housing element, the braking element is moved together with the housing element relative to the piston element, wherein at least in a portion of the displacement path the braking element is in frictional contact with the piston element or a component connected to the piston element such that a frictional force in-between the braking element and the piston element is provided for braking the movement of the piston element with respect to the housing element.

The braking element is tensioned radially by the tensioning device. The tensioning device herein acts radially onto the braking element. For this, the tensioning device may, for example, be constituted by a spring element, which, for example, may be constituted as a wrap spring which may extend circumferentially about the longitudinal axis and, for example, may surround the braking element in order to tension the braking element in a direction pointing radially inwards or may be placed within an inner bore of the braking element to tension the braking element in a direction pointing radially outwards.

It, however, is also conceivable that the braking element and the tensioning device are formed by a single element in that the braking element, for example, is formed by a spring-elastic element.

The braking element, at least within a portion of the displacement path, is in frictional contact with the piston element or the housing element or a component connected to the piston element or the housing element for providing a friction force in order to brake the movement of the piston element and the housing element with respect to each other. Herein, the braking element may be constituted to provide a friction force only within a portion of the displacement path, but not in another portion of the displacement path. Hence, the braking element only is in frictional contact with the piston element or the housing element within said portion of the displacement path, but not in another portion of the displacement path. Hence, a substantial friction between the braking element and the piston element or the housing element is provided only in said portion, and a braking of the piston element and the housing element with respect to each other is achieved only within said portion.

Said portion, in one embodiment, corresponds to an end portion of the displacement path immediately prior to reaching a stop position. In the stop position, a stop of the piston element abuts a stop of the housing element such that the piston element and the housing element cannot be moved further with respect to each other beyond the stop position. If, by means of the braking device, a braking is provided in such end portion of the displacement path, a damping of a movement of vehicle parts with respect to each other can be achieved prior to reaching the stop position.

Different embodiments are conceivable to provide a braking only within a portion of the displacement path, but not within other portions of the displacement path.

In one embodiment, the braking element may be carried along with the housing element in a first portion of the displacement path, but is carried along with the piston element in another, second portion of the displacement path. For this, the braking element, for example, may be arranged on the housing element in that it is in frictional contact with the housing element. When the piston element carries along the braking element in the second portion of the displacement path, hence, a friction between the braking element and the housing element occurs, which leads to a braking force braking the movement of the piston element and the housing element with respect to each other. Alternatively, the braking element can be arranged on the piston element in that it is in frictional contact with the piston element. In that case, when the braking element is carried along with the housing element in the first portion of the displacement path, a frictional movement of the braking element with respect to the piston element occurs, such that the movement of the housing element and the piston element with respect to each other is braked.

In another embodiment, a first braking element is arranged on the housing element and a second braking element is arranged on the piston element. At least one of the first braking element and the second braking element herein is elastically deformable along the radial direction, i.e., radial with respect to the longitudinal axis. The first braking element and the second braking element, at least within a portion of the displacement path, are in frictional contact with each other and, hence, provide a braking force for braking the movement of the housing element and the piston element with respect to each other.

The first braking element, which is arranged within the inner bore of the housing element and is axially fixed with respect to the housing element, comprises, in one embodiment, an inner bore into which the second braking element is moved when entering said portion of the displacement path. By moving into the inner bore, the second braking element comes into frictional contact with the first braking element such that a braking force in-between the first braking element and the second braking element occurs, leading to a braking of the movement of the housing element and the piston element with respect to each other.

The first braking element may have a generally cylindrical shape. Accordingly, the inner bore of the first braking element may have a generally cylindrical shape.

Likewise, the second braking element of the piston element may have a generally cylindrical shape.

In one embodiment, the first braking element is elastically deformable in the radial direction. When the second braking element is moved into the inner bore of the first braking element, hence, the first braking element is radially widened, which occurs against the tensioning force of the tensioning device such that the first braking element and the second braking element abut each other with pressure due to the tensioning force of the tensioning device.

To ease the moving of the second braking element (arranged on the piston element) into the inner bore of the first braking element (arranged on the housing element), the first braking element or the second braking element or both may comprise a tilted face at an end facing the other braking element. The tilted face has a slope oriented at a tilted angle with respect to the longitudinal axis. When the second braking element is moved into the inner bore of the first braking element, the tilted face provides a guiding slope which guides the second braking element into engagement with the inner bore of the first braking element.

Alternatively or in addition, the second braking element arranged on the piston element may be elastically deformable along the radial direction.

In one embodiment, when the second braking element arranged on the piston element is not in engagement with the inner bore of the first braking element, the shaft of the piston element may extend through the first braking element, but may not be in frictional contact with the first braking element. For this, the cylindrical shaft of the piston element may have a diameter which is smaller than the diameter of the second braking element. Hence, only when the second braking element is inserted into the inner bore of the first braking element, a frictional contact in-between the second braking element and the first braking element occurs, leading to a friction force in-between the braking elements and, hence, to a braking of the movement of the housing element and the piston element with respect to each other.

The braking elements may be constituted in different ways.

In one embodiment, the first braking element or the second braking element may be comprised of a multiplicity of brake shoes arranged to form a ring. The brake shoes are tensioned along the radial direction by the tensioning device.

In another embodiment, the first braking element or the second braking element may be formed as a slotted cylindrical bushing. One or multiple slots herein may be arranged on the bushing such that the bushing is radially deformable. The tensioning device herein may act on the bushing providing a tensioning of the bushing along the radial direction.

The first braking element or the second braking element, in yet another embodiment, may be constituted by an elastic spring element which is radially deformable. In this embodiment, the tensioning device is integrated into the braking element in that by elastically deforming the spring element, a tensioning is provided, such that the spring element itself also acts as a tensioning device.

A breaking device as described herein may in particular be used to brake a movement of a tailgate of a vehicle relative to a vehicle body. The tailgate may be pivotably arranged on the vehicle body. The braking device may extend in-between the tailgate and the vehicle body, such that by pivoting the tailgate with respect to the vehicle body the housing element and the piston element of the braking device are moved with respect to each other. By such movement, a braking of the tailgate and the vehicle body with respect to each other at least in portions of the pivoting movement range may be provided.

The braking device may be used in connection with an electro-motoric drive device. With respect to a tailgate, at one side of the tailgate an electro-motoric drive device may be used for electro-motorically driving the movement of the tailgate with respect to the vehicle body. On the other side of the tailgate a passive, mechanical braking device may be used.

BRIEF DESCRIPTION OF THE DRAWINGS

Other advantages of the present invention will be readily appreciated from the following detailed description of the invention when considered in connection with the accompanying drawings, wherein:

FIG. 10A shows a schematic view of yet another embodiment of a braking device, in a first position of a piston element with respect to a housing element;

FIG. 10B shows a schematic view of a first end position of the braking device;

FIG. 10C shows another, second end position of the braking device; and

DETAILED DESCRIPTION OF THE INVENTION

Figure 1:
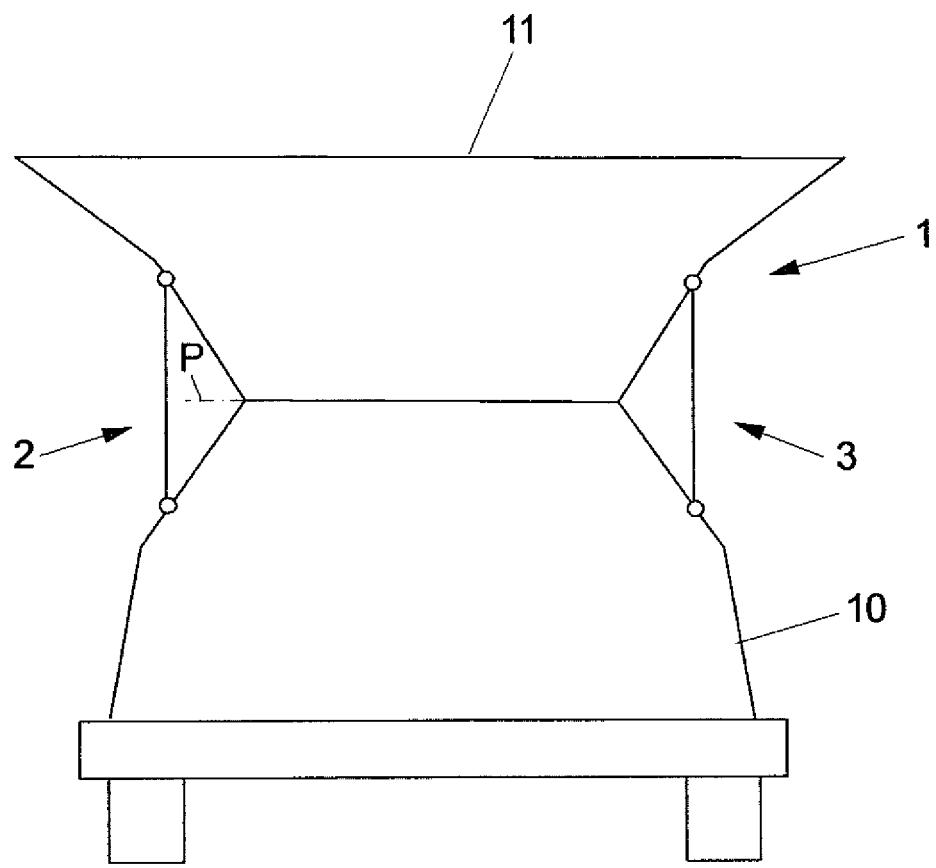
FIG. 1 shows a schematic drawing of a tailgate of a vehicle.

FIG. 1 shows in a schematic view a vehicle 1 having, at its rear, a tailgate 11 which is pivotable about a pivoting axis P with respect to a vehicle body 10. In a closed state the tailgate 11 closes—in a matter per se known—a rear opening within the vehicle body 10. The tailgate 11 can be pivoted about the pivoting axis P in order to open the rear opening of the vehicle body 10 to allow access to the inside of the vehicle 1 from the rear.

In the shown embodiment, the tailgate 11 is connected to the vehicle body 10 in a pivotable manner about the pivoting axis P. Further, at one side of the tailgate 11 an electro-motoric adjustment device 3 extends in-between the tailgate 11 and the vehicle body 10, whereas on the other, opposite side of the tailgate 11 a mechanical, passive braking device 2 connects the tailgate 11 to the vehicle body 10.

The electro-motoric adjustment device 3 serves to pivot the tailgate 11 about the pivoting axis P with respect to the vehicle body 10 between its closed position and its opened position. The adjustment device 3, for this, comprises an electric motor and may be constituted, for example, as a spindle drive comprising a spindle and a spindle nut arranged on the spindle such that, by rotating the spindle, the spindle nut can be moved along the spindle.

A spindle drive of this kind is for example known from EP 2 383 412 A2, which shall be incorporated by reference herein.

The braking device 2, on the other hand, serves to passively brake the pivoting motion of the tailgate 11 with respect to the vehicle body 10 in particular when the tailgate 11 approaches one of its end positions. The braking device 2 in particular may be constituted to dampen the movement of the tailgate 11 when it approaches its fully opened position. Alternatively or in addition, the braking device 2 may also be constituted to dampen the movement of the tailgate 11 when it approaches its fully closed position.

Figure 2:
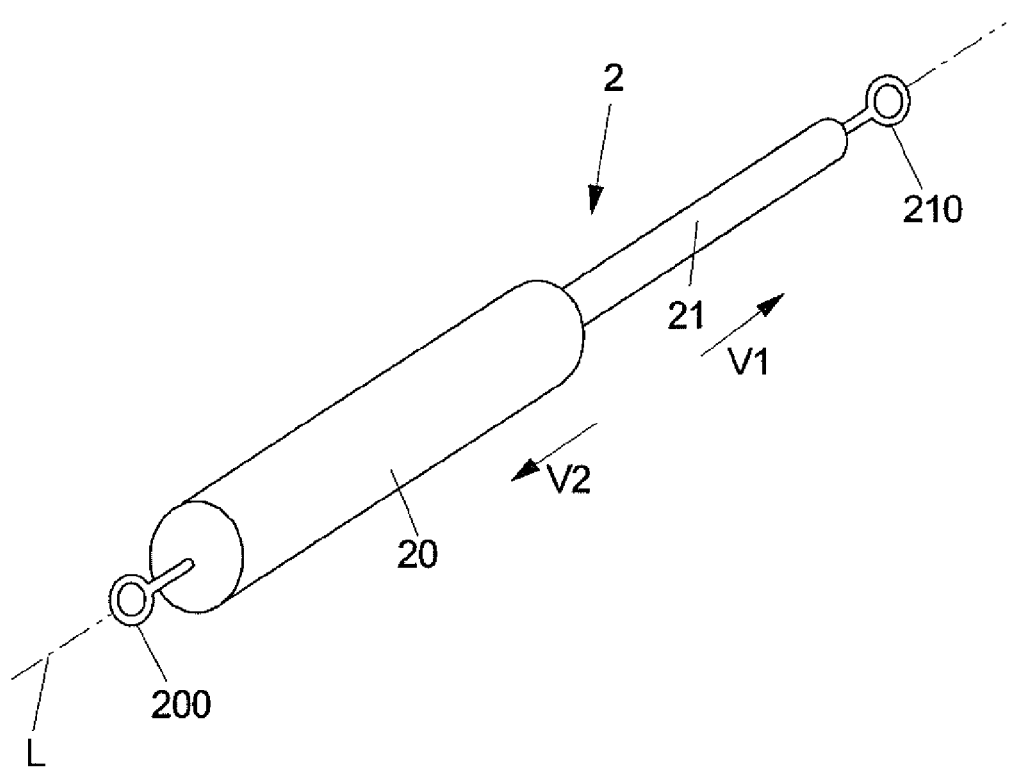
FIG. 2 shows a schematic drawing of a braking device.

An embodiment of a braking device 2 is schematically shown in FIG. 2. The braking device 2 comprises a housing element 20 in the shape of a tube element and a piston element 21. The piston element 21 extends into the housing element 20, in particular an inner bore of the housing element 20, such that the piston element 21 and the housing element 20 are movable with respect to each other along a longitudinal axis L along which the housing element 20 and the piston element 21 extend. The housing element 20 may be hingedly connected to one of the tailgate 11 and the vehicle body 10 via a hinge element 200. Likewise, the piston element 21 may be hingedly connected to the other of the tailgate 11 and the vehicle body 10 via a hinge element 210.

The piston element 21 may be moved with respect to the housing element 20 in a direction V1 in order to elongate the length of the braking device 2, i.e., to increase the distance between the hinge elements 200, 210. In this direction V1, the housing element 20 and the piston element 21 are moved relative to each other when the tailgate 11 is opened.

In turn, the piston element 21 may be moved relative to the housing element 20 in a direction V2 to shorten the length of the braking device 2, i.e., to decrease the distance between the hinge element 200, 210. In this direction V2 the housing element 20 and the piston element 21 are moved relative to each other when the tailgate 11 is closed.

Figure 3:
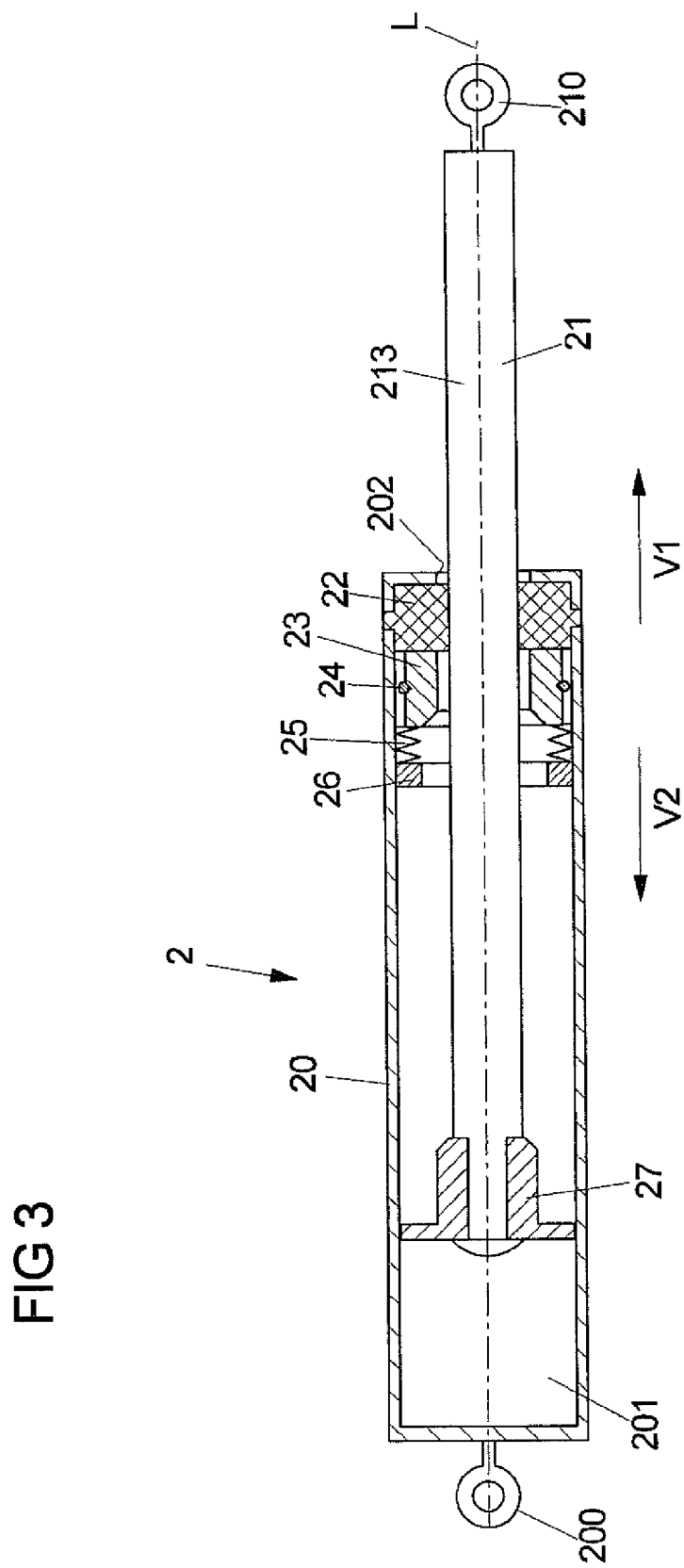
FIG. 3 shows a schematic, cross-sectional drawing of the braking device of FIG. 2.
Figure 4A:
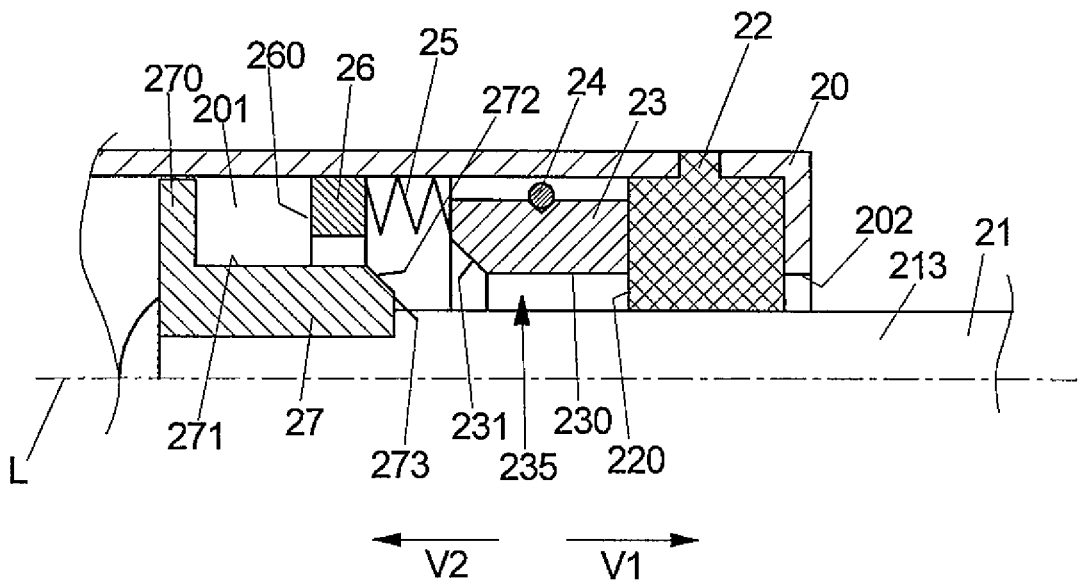
FIG. 4A shows an enlarged portion of the embodiment of FIG. 3.

An embodiment of the braking device 2 is shown in a cross-sectional, schematic view in FIG. 3 and in an increased view in FIG. 4A. The cross-sectional view represents a cross-section through the braking device 2 in a cross-sectional plane spanned by the longitudinal axis L and an axis perpendicular to the longitudinal axis L.

Figure 4B:
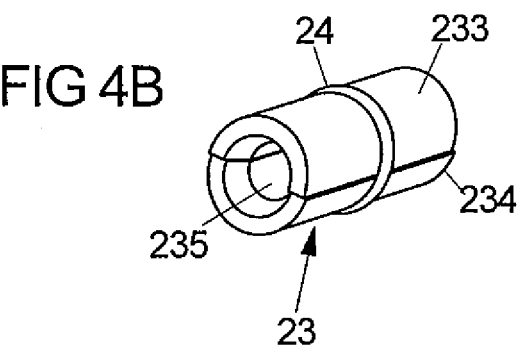
FIG. 4B shows a schematic, separate view of a braking element arranged on a housing element of the braking device.

In the embodiment of FIGS. 3 and 4A, 4B, the piston element 21 is mounted in a displaceable fashion on the housing element 20 via a guide element 22 in the shape of a sleeve through which the piston element 21 extends with a shaft 213. At an end opposite to the hinge element 210, the piston element 21 carries a braking element 27 having a flange 270 and, on a cylindrical body, a friction face 271 corresponding to the circumferential face of the cylindrical body. The braking element 27 is axially fixed to the shaft 213 of the piston element 21 and, hence, is fixedly connected to the piston element 21.

The housing element 20 comprises an inner bore 201 into which the piston element 21 with its shaft 213 extends. The guide element 22 in the shape of the sleeve is placed within the inner bore 201 and guides the shaft 213 along the longitudinal axis L. The piston element 21 with its shaft 213 extends through an opening 202 in the housing element 20 into the inner bore 201.

In addition, a braking element 23 is placed within the inner bore 201 of the housing element 20 and is axially secured within the inner bore 201 in-between the guide element 22 on the one hand and a ring element 26 on the other hand. A fixation element in the shape of an elastic spring element 25 may be placed in-between the braking element 23 and the ring element 26 in order to spring-elastically tension the braking element 23 in the axial direction in-between the guide element 22 and the ring element 26.

The braking element 27 of the piston element 21 has a rigid shape and is substantially not deformable.

In contrast, the braking element 23 consists of two or more brake shoes 233, 234, as it is schematically shown in FIG. 4B. The brake shoes 233, 234 are arranged with respect to each other such that they form a ring element confining an inner bore 235. The braking element 23, with its brake shoes 233, 234, hence, has a generally cylindrical shape and has a generally cylindrical inner bore 235.

The brake shoes 233, 234 of the braking element 23 are tensioned by means of a tensioning device 24 in the shape of a spring element extending circumferentially around the brake shoes 233, 234. By means of the tensioning device 24, the brake shoes 233, 234 are tensioned in a direction pointing radially inwards such that the brake shoes 233, 234 may be displaced radially outwards against the tensioning force provided by the tensioning device 24 in order to radially widen the braking element 23.

The braking device 2 functions as follows:

When the tailgate 11 is in its closed position, the braking element 27 is arranged within the inner bore 201 of the housing element 20 in a position close to the hinge element 200. The piston element 21 with its shaft 213, hence, substantially extends within the inner bore 201 of the housing element 20.

If the tailgate 11 is opened from its closed position, the piston element 21 is moved in the inner bore 201 of the housing element 20 in the direction V1 and, hence, is drawn out of the inner bore 201. By this, the braking element 27 at the end of the shaft 213 of the piston element 21 is approached the braking element 23 arranged at the guide element 22 on the housing element 20 and comes to engage the braking element 23 when the tailgate 11 is close to its fully opened position.

When the tailgate 11 approaches its fully opened position, the cylindrical braking element 27 of the piston element 21 is inserted into the inner bore 235 of the braking element 23 of the housing element 20. For this, a tilted, conical face 272 of the braking element 27 runs up a tilted, conical face 231 at the entrance of the inner bore 235 of the braking element 23, causing the braking element 23 to be radially widened in that the brake shoes 233, 234 are radially displaced with respect to each other against the tensioning force of the tensioning device 24.

When the braking element 27 is inserted into the inner bore 235 of the braking element 23, the circumferential friction face 271 of the braking element 27 comes in frictional contact with an inner circumferential friction face 230 within the inner bore 235 of the braking element 23. The braking elements 23, 27, hence, are in frictional contact and provide a braking force for braking the movement of the piston element 21 and the housing element 20 with respect to each other. The movement of the tailgate 11, hence, is dampened prior to reaching the fully opened position.

The fully opened position is defined by a stop of the piston element 21 abutting a corresponding stop of the housing element 20. A stop of the piston element 21 herein may be formed by a front face 273 of the braking element 27 abutting a stop in the shape of a stop face 220 of the guide element 22 in the closed position. In addition or alternatively, a stop may be provided on the side of the piston element 21 by the flange 270 abutting a stop face 260 of the ring element 26 in the fully opened position of the tailgate 11.

By means of the braking device 2, hence, a damping of the movement of the tailgate 11 relative to the vehicle body 10 is provided immediately prior to reaching the fully opened position. Prior to reaching the fully opened position, the braking elements 23, 27 of the piston element 21 on the one hand and the housing element 20 on the other hand come into frictional contact with each other, such that a frictional braking force is provided for braking the movement of the piston element 21 and the housing element 20 with respect to each other.

The movement of the piston element 21 and the housing element 20 with respect to each other, hence, is braked only in an end portion of a displacement path over which the piston element 21 and the housing element 20 are moveable with respect to each other. In other portions, however, the braking elements 23, 27 are not in frictional contact with each other such that, beyond a general friction between the housing element 20 and the piston element 21, substantially no braking force is provided.

When the tailgate 11, starting from its fully opened position, is closed again, the piston element 21 is pushed into the housing element 20 in the direction V2. The braking element 27 of the piston element 21, hence, is moved out of the inner bore 235 of the braking element 23 of the housing element 20 such that, after leaving the end portion of the displacement path, no friction in-between the braking elements 23, 27 occurs.

Figure 9:
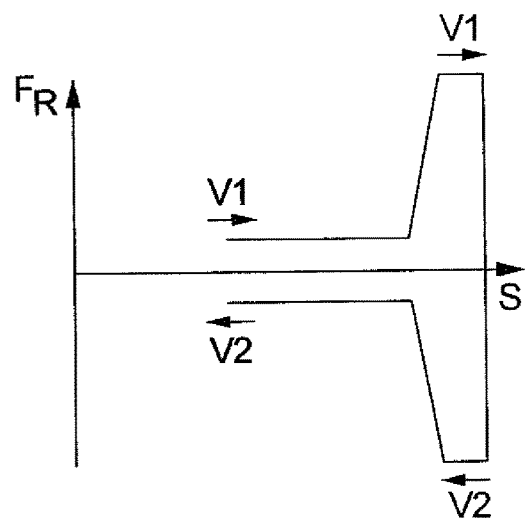
FIG. 9 shows a curve of a friction force over a displacement path when moving a piston element with respect to a housing element of a braking device.

The frictional forces provided by the braking device 2 when opening and closing the tailgate 11 are shown in a schematic diagram in FIG. 9. When opening the tailgate 11, the braking device 2 first provides a very small braking force $F_R$ due to the general friction within the braking device 2. When the end portion of the displacement path S is reached, the braking element 27 is moved into the inner bore 235 of the braking element 23 such that the frictional force $F_R$ increases and counteracts the movement of the piston element 21 and the housing element 20 with respect to each other (see the curve at the top of FIG. 9).

In turn, when the tailgate 11 is closed from its fully opened position, at first a large frictional force $F_R$ is provided by the braking device 2 because the braking elements 23, 27 are in contact with each other. Once the end portion of the displacement path S is left, the frictional force $F_R$ drops such that a small frictional force $F_R$ due to the general friction within the braking device 2 is provided for the further movement of the tailgate 11 (see the curve at the bottom).

Figure 5:
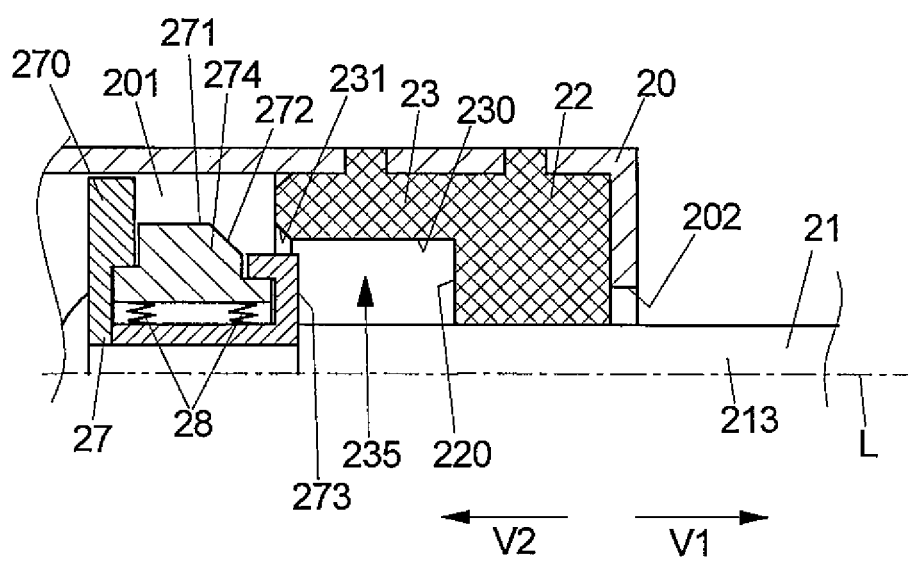
FIG. 5 shows an enlarged, schematic view of another embodiment of a braking device.

Another embodiment of a braking device 2 is shown in FIG. 5. In this embodiment, the braking element 23 of the housing element 20 is integrated with the guide element 22 and is formed as a rigid piece which is substantially not deformable in the radial direction. A braking section 274 is arranged on the braking element 27 of the piston element 21. The braking section 274 is radially tensioned by means of a tensioning device 28 in the shape of elastic spring elements.

When the braking element 27 of the piston element 21 is moved into the braking element 23 of the housing element 20, the braking section 274 is displaced radially inwards against the tensioning force of the tensioning device 28, such that an outer frictional face 271 of the braking section 274 comes into frictional contact with an inner cylindrical frictional face 230 of the braking element 23.

Within the embodiment of FIG. 5, the braking element 23 of the housing element 20 is formed as a rigid piece, whereas the braking element 27 of the piston element 21 has an elastically tensioned braking section 274. Other than that, the function of the braking device 2 is similar as described above for the embodiment of FIG. 4A. Also, a similar curve of the friction force $F_R$ as shown in FIG. 9 arises albeit with a reduced friction force along a smaller friction face 271.

Figure 6A:
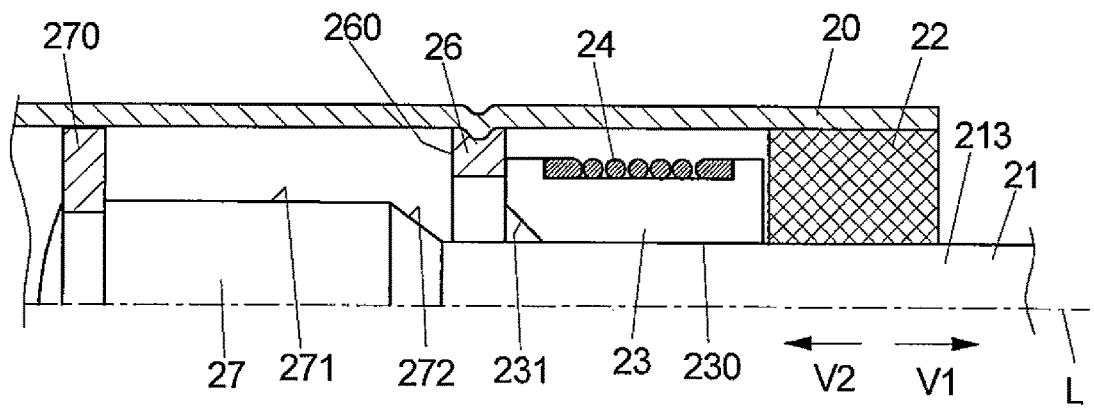
FIG. 6A shows a schematic view of yet another embodiment of a braking device.
Figure 6B:
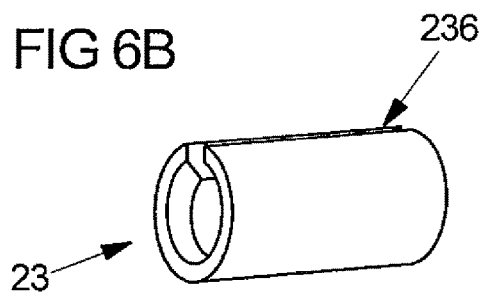
FIG. 6B shows a schematic, separate view of a braking element arranged on a housing element of the embodiment of FIG. 6A.

Yet another embodiment of a braking device 2 is shown in FIG. 6A and 6B. In this case, similar to the embodiment of FIG. 4A, the braking element 27 is formed as a rigid piece and is rigidly attached to an end of the shaft 213 of the piston element 21. In this embodiment, the braking element 23 of the housing element 20 is formed as a slotted bushing having a longitudinal slot 236, as schematically shown in FIG. 6B, which is tensioned in a radially inwards pointing direction by means of a tensioning device 24 in the shape of a wrap spring extending around the braking element 23 at its outside. The braking element 23 is radially deformable against the tensioning of the tensioning device 24.

The function of the braking device 2 of the embodiment of FIG. 6A and 6B is substantially the same as described above for the embodiment of FIG. 4A. When the tailgate is opened, at an end portion of the displacement path the braking element 27 of the piston element 21 comes into engagement with an inner bore of the braking element 23, causing the braking element 23 to be radially widened. The braking element 27, hence, is inserted into the braking element 23 and, with a circumferential frictional face 271, comes into frictional contact with an inner circumferential frictional face 230 of the braking element 23.

In the embodiment of FIG. 6A, the braking element 23 is in frictional contact with the shaft 213 when the braking element 27 is not inserted into the inner bore of the braking element 23. Hence, the frictional force provided by the braking device 2 is larger also in portions of the displacement path outside of the end portion prior to reaching the fully opened position of the tailgate 11.

The braking device 2 according to the embodiment FIG. 6A, hence, provides a braking force over the entire movement range of the tailgate 11, but with an increased braking force in the end portion of the displacement path immediately prior to reaching the fully opened position.

Figure 7:
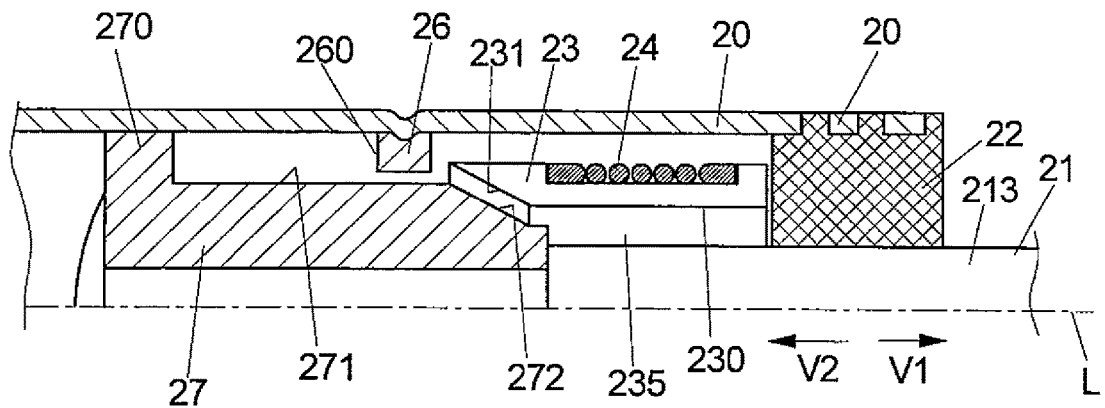
FIG. 7 shows a schematic view of yet another embodiment of a braking device.

FIG. 7 shows yet another embodiment of a braking device 2. The embodiment of FIG. 7 is substantially the same as the embodiment of FIG. 6A. However, within the embodiment of FIG. 7, the braking element 23 has an inner bore 235 which is larger in diameter than the diameter of the shaft 213 of the piston element 21 such that it is not in frictional contact with the shaft 213 outside of the end portion of the displacement path. The braking device 2 of the embodiment 8 provides a substantial braking force only in the end portion of the displacement path immediately prior to reaching the fully opened position of the tailgate 11.

Figure 8:
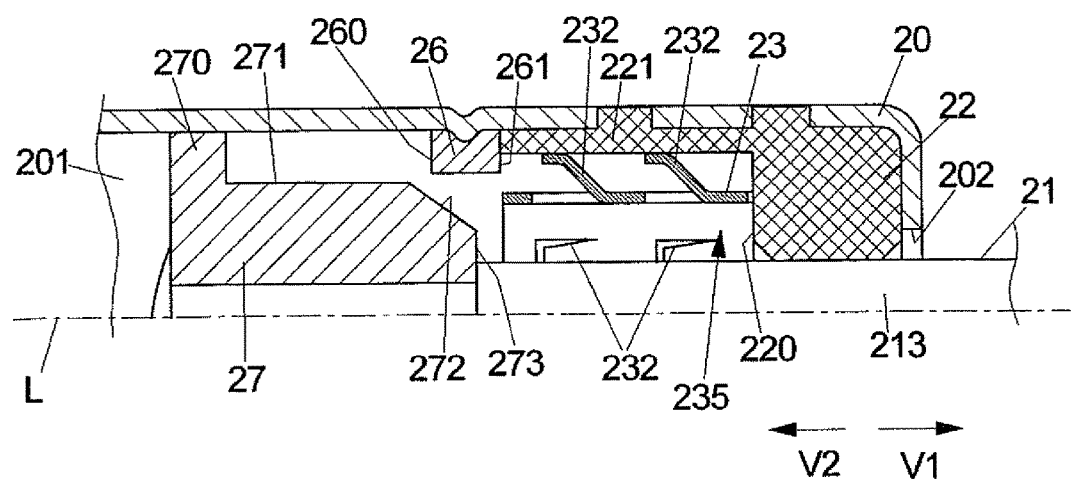
FIG. 8 shows a schematic view of yet another embodiment of a braking device.

FIG. 8 shows yet another embodiment of a braking device 2. In this embodiment, the braking element 23 is formed by an elastic spring element 23 which may be radially widened. The braking element 27 of the piston element 21 in turn is formed as rigid piece.

In this case, the braking element 23 of the housing element 20 and the tensioning device are integrally formed by one element in that the braking element 23 comprises spring arms 232 extending towards a bushing section 221 of the guide element 22, the bushing section 221 circumferentially extending around the braking element 23 within the inner bore 201 of the housing element 20.

If the braking element 27 of the piston element 21 is inserted into the inner bore 235 of the braking element 23 of the housing element 20, the braking element 23 is radially widened such that the braking element 27 of the piston element 21 with its frictional face 271 comes into frictional contact with the braking element 23. The radial widening of the braking element 23 takes place against the tensioning force of the spring arms 232 such that the spring arms 232 serve as a tensioning device.

The guide element 22, in this embodiment but also for other embodiments, may be made from plastics. By means of the bushing section 221 of the guide element 22, hence, a beneficial mounting of the braking element 23 within the housing element 20 is achieved, the spring arms 232 abutting the bushing section 221 from the inside. Because the bushing section 221, together with the guide element 22, may be made from plastics, a generation of unwanted noise due to the contact of the spring arms 232 with the housing element 20 may be prevented.

The spring arms 232 also serve to axially secure the braking element 23 within the inner bore 201 of the housing element 20. Namely, the spring arms 232, when the braking element 27 is moved out of the braking element 23, come into abutment with a face 261 of the ring element 26, such that the braking element 23 cannot be axially moved beyond the ring element 26.

FIG. 10A to 10C show yet another embodiment of a braking device 2. In this embodiment, a braking element 23 is provided on the housing element 20 and is in frictional contact with an inner circumferential face of the housing element 20. The braking element 23 has a general shape of a cylindrical bushing, wherein a tensioning device 24 in the shape of wrap spring is placed radially inside the braking element 23 and provides a tensioning force onto the braking element 23 pointing radially outwards.

In this embodiment, no braking element is provided on the piston element 21, but a braking force is provided by frictional contact of the braking element 23 with the housing element 20.

The braking device 2 functions as follows:

When the tailgate 11 is opened from its closed position, the piston element 21 is drawn out of the housing element 20. When the tailgate 11 approaches its fully opened position, a flange 270 fixed to the shaft 213 of the piston element 21 comes into abutment with the braking element 23 and carries along the braking element 23 in the opening direction V1. Because the piston element 21 carries the braking element 23 along, the braking element 23 is frictionally moved with respect to the housing element 20 in the direction V1 such that a braking force is provided by the braking device 2.

When the fully opened position of the tailgate 11 is reached, the piston element 21 and the braking element 23 assume the position relative to the housing element 20 as shown in FIG. 10B. Because the piston element 21 with its flange 270—via the braking element 23 and flange 291 of a slide element 29—is in abutment with the guide element 22, a stop position is reached beyond which the piston element 21 cannot be moved in the direction V1 with respect to the housing element 20.

Prior to reaching the fully opened position, the braking device 2, hence, provides a braking force such that the movement towards the stop position is dampened.

When the tailgate 11 is closed from its fully opened position, the piston element 21 is moved into the housing element 20 in the direction V2, as it is indicated in FIG. 10C. This takes place at first without the braking element 23 being moved relative to the housing element 20 and, hence, without substantial friction in-between the piston element 21 and the housing element 20.

Only prior to reaching the fully closed position, an abutment face 211 on a section 212 of the piston element 21 comes into abutment with a face 292 of the slide element 29, such that the slide element 29 is carried along in the direction V2 with the piston element 21. The slide element 29 acts onto the braking element 23, such that also the braking element 23 is carried along with the piston element 21 and is frictionally moved with respect to the housing element 20. Hence, immediately prior to reaching the fully closed position, a braking force is provided by the braking device 2 due to the frictional movement of the braking element 23 relative to the housing element 20.

Figure 11:
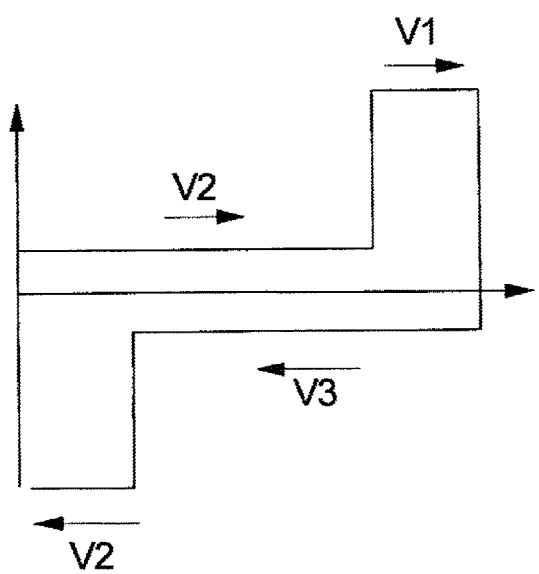
FIG. 11 shows a curve of friction forces acting in-between the housing element and the piston element in the embodiment of FIG. 10A to 10C.

The frictional braking forces provided by the braking device 2, hence, are asymmetric. As shown in a diagram in FIG. 11, when opening the tailgate 11 at first substantially no or very small frictional forces $F_R$ are provided by the braking device 2, which increase to brake the movement of the tailgate 11 immediately prior to reaching the fully opened position (see the curve at the top of FIG. 11). In turn, when the tailgate 11 is closed from its fully opened position, at first substantially no or very small frictional forces $F_R$ are provided, which increase to brake the movement of the tailgate 11 immediately prior to reaching the fully closed position (see the curve at the bottom of FIG. 11).

Hence, with the braking device 2 according to the embodiment of FIG. 10A to 10C, a braking action both immediately prior to reaching the fully opened position of the tailgate 11 and immediately prior to reaching the fully closed position of the tailgate 11 is provided.

The braking element 23, in this embodiment, may for example have the shape of a slotted bushing, similar to the bushing shown in FIG. 6B.

The invention is not limited to the embodiment described above, but may be implemented in entirely different embodiments.

The braking device as described above may beneficially be combined with an electro-motoric drive such that a tailgate on one side is connected with a vehicle body via a passive mechanical braking device and on the other side via an electro-motoric adjustment device for motorically moving the tailgate with respect to the vehicle body.

In principle, a braking device as described herein may be used and employed also for braking a movement of other vehicle parts with respect to other. As such, the braking device is not limited to a tailgate.

What is claimed is:

1. A braking device for braking a movement of a first vehicle part and a second vehicle part with respect to each other, the braking device comprising:
    a housing having an inner bore;
    a piston having a shaft extending in the inner bore along a longitudinal axis and being mounted on the housing such that the shaft is displaceable along the longitudinal axis with respect to the housing along a displacement path;
    a brake arranged within the inner bore of the housing and configured to provide a friction force for braking a displacement movement of the piston and the housing with respect to each other at least within a portion of the displacement path;
    a tensioning device configured to act radially with respect to the longitudinal axis onto the brake to provide a radial tensioning force;
    wherein the brake is in frictional contact with the housing or the piston or a component connected to the housing or the piston at least within said portion of the displacement path; and
    wherein the tensioning device comprises a wrap spring circumferentially extending about the longitudinal axis for acting radially onto the brake.

2. The braking device of claim 1, wherein said brake, at least within said portion of the displacement path, is moved together with one of the piston and the housing relative to the other of the piston and the housing.

3. The braking device of claim 1, wherein said brake is axially fixed with respect to said one of the piston and the housing.

4. The braking device of claim 1, wherein said brake, at least within said portion of the displacement path, is in frictional contact with the other of the piston and the housing for providing a friction force in order to brake the movement of the piston and the housing with respect to each other.

5. The braking device of claim 1, wherein said brake is configured to provide a friction force for braking the displacement movement of the piston and the housing with respect to each other in said portion of the displacement path, but not in at least one other portion of the displacement path.

6. The braking device of claim 1, wherein said portion of the displacement path corresponds to an end portion of the displacement path immediately prior to reaching a stop position in which a stop of the piston abuts a stop of the housing.

7. The braking device of claim 1, wherein the brake is configured to be carried along with the housing in a first portion of the displacement path and is configured to be frictionally moved with respect to the piston and is configured to be carried along with the piston in a second portion of the displacement path and is configured to be frictionally moved with respect to the housing in the second portion of the displacement path.

8. A tailgate of a vehicle comprising a braking device according to claim 1 for braking a pivoting movement of the tailgate with respect to a vehicle body.

9. The braking device of claim 1, wherein the brake comprises a first brake located on the housing and a second brake located on the piston, wherein at least one of the first brake and the second brake is elastically deformable along the radial direction, wherein the first brake and the second brake are in frictional contact with each other in said portion of the displacement path.

10. The braking device of claim 9, wherein said second brake is generally cylindrical.

11. The braking device of claim 9, wherein a diameter of the second brake is larger than a diameter of the cylindrical shaft of the piston.

12. The braking device of claim 9, wherein the first brake or the second brake comprises a multiplicity of brake shoes arranged to form a ring, the brake shoes being tensioned along a radial direction by the tensioning device.

13. The braking device of claim 9, wherein the first brake or the second brake comprises a slotted cylindrical bushing having at least one slot, the slot being arranged such that the bushing is radially deformable, wherein the bushing is tensioned along the radial direction by the tensioning device.

14. The braking device of claim 9, wherein the first brake or the second brake comprises an elastic spring which is radially deformable.

15. The braking device of claim 9, wherein the first brake has an inner bore in which the second brake is configured to be moved within said portion of the displacement path.

16. The braking device of claim 15, wherein the inner bore is generally cylindrical.

17. The braking device of claim 15, wherein the first brake is elastically deformable in a radial direction, wherein the first brake is configured to be radially widened against the tensioning force of the tensioning device when the second brake is moved into the inner bore of the first brake.

18. The braking device of claim 15, wherein at least one of the first brake and the second brake comprises a tilted face having a slope oriented at a tilted angle with respect to the longitudinal axis for guiding the second brake into engagement with the first brake.

19. A braking device for braking a movement of a first vehicle part and a second vehicle part with respect to each other, the braking device comprising:
    a housing having an inner bore;
    a piston having a shaft extending in the inner bore along a longitudinal axis and being mounted on the housing such that the shaft is displaceable along the longitudinal axis with respect to the housing along a displacement path;

a brake arranged within the inner bore of the housing and configured to provide a friction force for braking a displacement movement of the piston and the housing with respect to each other at least within a portion of the displacement path;

a tensioning device configured to act radially with respect to the longitudinal axis onto the brake to provide a radial tensioning force;

wherein the brake is in frictional contact with the housing or the piston or a component connected to the housing or the piston at least within said portion of the displacement path;

wherein a first brake is arranged on the housing and a second brake is arranged on the piston, wherein the first brake and the second brake are in frictional contact with each other in said portion of the displacement path and; wherein the second brake is elastically deformable along the radial direction.

* * * * *